(12) United States Patent
Ogle et al.

(10) Patent No.: US 9,518,207 B2
(45) Date of Patent: Dec. 13, 2016

(54) METHODS TO PREVENT FORMATION DAMAGE FROM FRICTION REDUCERS

(75) Inventors: James William Ogle, Duncan, OK (US); Xiangnan Ye, Duncan, OK (US); Pinmanee Boontheung, Duncan, OK (US); Rajesh Kumar Saini, Cypress, TX (US); Narongsak Tonmukayakul, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 547 days.

(21) Appl. No.: 13/538,803

(22) Filed: Jun. 29, 2012

(65) Prior Publication Data

US 2014/0005080 A1 Jan. 2, 2014

(51) Int. Cl.
| | |
|---|---|
| *C09K 8/60* | (2006.01) |
| *C09K 8/68* | (2006.01) |
| *C09K 8/588* | (2006.01) |
| *C23F 11/14* | (2006.01) |
| *C09K 8/035* | (2006.01) |

(52) U.S. Cl.
CPC ........... *C09K 8/035* (2013.01); *C09K 2208/28* (2013.01)

(58) Field of Classification Search
CPC .... C09K 8/035; C09K 2208/28; Y10S 507/94
USPC ........ 507/209, 213, 211, 219, 225, 261, 267
See application file for complete search history.

(56) References Cited

U.S. PATENT DOCUMENTS

| | | | |
|---|---|---|---|
| 3,943,060 A | 3/1976 | Martin et al. | |
| 4,289,873 A * | 9/1981 | Kubo | C08G 63/823 528/357 |
| 4,973,172 A | 11/1990 | Nisley et al. | |
| 5,027,843 A | 7/1991 | Grabois et al. | |
| 5,399,604 A * | 3/1995 | Sano | C08F 220/04 522/114 |
| 6,121,371 A * | 9/2000 | Matyjaszewski | C08F 4/00 522/6 |
| 7,168,489 B2 | 1/2007 | Frost et al. | |
| 7,205,262 B2 | 4/2007 | Schwartz et al. | |
| 7,256,160 B2 | 8/2007 | Crews | |
| 7,285,582 B2 | 10/2007 | Harris et al. | |
| 7,468,402 B2 | 12/2008 | Yang et al. | |

(Continued)

FOREIGN PATENT DOCUMENTS

| | | |
|---|---|---|
| WO | 2007068876 A1 | 6/2007 |
| WO | 2008151150 A2 | 12/2008 |

OTHER PUBLICATIONS

Bourbigot, S., et al., "Thermal Degradation of Poly(p-Phenylenebenzobisoxazole) and Poly(p-Phenylenediamine Terephthalamide) Fibres," Polymer International, 2001, vol. 50, pp. 157-164, Society of Chemical Industry.

(Continued)

*Primary Examiner* — Aiqun Li
(74) *Attorney, Agent, or Firm* — Craig W. Roddy; Baker Botts L.L.P.

(57) ABSTRACT

A method of servicing a wellbore comprising placing a wellbore servicing fluid comprising a modified friction reducer into the wellbore. A modified friction reducer comprising a degradable polymer having functional degradable moieties, a polymer having a molecular weight of from about 5M to about 30M, a polymer having a PDI of from about 1.0 to about 2.5, a weakly crosslinked polymer, or combinations thereof.

8 Claims, 4 Drawing Sheets

(56) References Cited

U.S. PATENT DOCUMENTS

| | | |
|---|---|---|
| 7,579,302 B2 | 8/2009 | McMechan et al. |
| 7,621,334 B2 | 11/2009 | Welton et al. |
| 7,621,335 B2 | 11/2009 | Valeriano et al. |
| 7,677,315 B2 | 3/2010 | Saini et al. |
| 7,712,534 B2 | 5/2010 | Bryant et al. |
| 7,763,671 B2 | 7/2010 | Harris et al. |
| 7,846,878 B2 | 12/2010 | Robb et al. |
| 2009/0105097 A1 | 4/2009 | Abad et al. |
| 2010/0200239 A1 | 8/2010 | Aften |
| 2011/0245114 A1 | 10/2011 | Gupta et al. |
| 2011/0269651 A1 | 11/2011 | Bismarck et al. |
| 2011/0269904 A1 | 11/2011 | Bismarck et al. |
| 2012/0090848 A1 | 4/2012 | Reddy |
| 2012/0245061 A1 | 9/2012 | Kakadjian et al. |

OTHER PUBLICATIONS

Kim,Yoon Kyung, et al., "Isolation of Intact Proteins from Acid-Degradable Polyacrylamide Gel," Proteomics, 2009, vol. 9, pp. 3765-3771, Wiley-VCH Verlag GmgH & Co. KGaA, Weinheim.

Kim, Yoon Kyung, et al., "Separation and Recovery of Nucleic Acids with Improved Biological Activity by Acid-Degradable Polyacrylamide Gel Electrophoresis," Electrophoresis, 2010, vol. 31, pp. 1656-1661, Wiley-VCH Verlag GmgH & Co. KGaA, Weinheim.

Kot, Emilia, et al., "Polyacrylamide Containing Weak Temperature Labile Azo Links in the Polymer Backbone," Macromolecules, 2010, vol. 43, No. 15, pp. 6469-6475, American Chemical Society.

Rikkou, Maria D., et al., "End-Linked Amphiphilic Polymer Conetworks: Synthesis by Sequential Atom Transfer Radical Polymerization and Swelling Characterization," Journal of Polymer Science: Part A: Polymer Chemistry, 2010, vol. 48, pp. 1878-1886, Wiley Periodicals, Inc.

Witten, Jr., T. A., "Cross-Linking in Shear-Thickening Ionomers," Macromolecules, 1985, vol. 18, No. 10, pp. 1915-1918, American Chemical Society.

Advisory Action dated Aug. 9, 2012 (3 pages), U.S. Appl. No. 12/771,973 filed Apr. 30, 2010.

Amro, Mohammed M., et al., "Investigation of polymer adsorption on rock surface of high saline reservoirs," Chem. Eng. Technol., 2002, pp. 1005-1013, vol. 25, No. 10, Wiley-VCH Verlag GmbH & Co. KGaA, Weinheim.

Arslan, Hülya, et al., "Ceric ion initiation of methyl methacrylate from poly(glycidyl azide)-diol," European Polymer Journal, 2001, pp. 581-585, vol. 37, Elsevier Science Ltd.

Atici, Oya Galioğlu, et al., "Synthesis of block copolymers via redox polymerization," Journal of Applied Polymer Science, 1999, pp. 1385-1395, vol. 71, John Wiley & Sons, Inc.

Bae, You Han, et al., "Biodegradable amphiphilic multiblock copolymers and their implications for biomedical applications," Journal of Controlled Release, 2000, pp. 3-13, vol. 64, Elsevier Science B.V.

Bailey, William J., et al., "Free radical ring-opening polymerization of 4,7-Dimethyl-2-methylene-1,3-dioxapane and 5,6-Benzo-2-methylene-1,3-dioxepane," Macromolecules, May-Jun. 1982, pp. 711-714, vol. 15, No. 3, American Chemical Society.

Çakmak, Ismail, "A review of poly(ethylene oxide)-based block copolymers," Macromolecular Reports, 1995, pp. 1113-1122, vol. A32, Suppl. 7, Marcel Dekker, Inc.

Cakmak, Ismail, "Preparation of multiphase block copolymers by redox polymerization process, 4a," Die Angewandte Makromolekulare Chemie, 1995, pp. 49-54, vol. 224, No. 3884, Hüthig & Wepf Verlag, Zug.

Çakmak, Ismail, "Synthesis of block copolymers by redox macro initiators," Macromolecular Reports, 1995, pp. 197-206, vol. A32, Suppls. 1 and 2, Marcel Dekker, Inc.

Erciyes, A. Tuncer, et al., "Grafting onto preformed polyester network using thermolabile azo groups," Journal of Applied Polymer Science, 1990, pp. 1569-1573, vol. 41, John Wiley & Sons, Inc.

Erciyes, A. Tuncer, et al., "Synthesis of polyacrylamide flocculants with poly(ethylene glycol) segments by redox polymerization," Die Angewandte Makromolekulare Chemie, 1992, pp. 163-171, vol. 200, No. 3500, Hüthig & Wepf Verlag, Basel.

Feng, Yujun, et al., "Hydrophobically associating polyacrylamides and their partially hydrolyzed derivatives prepared by post-modification. 2. Properties of non-hydrolyzed polymers in pure water and brine," Polymer, 2005, pp. 9283-9295, vol. 46, Elsevier Ltd.

Foreign communication from a related counterpart application—International Search Report and Written Opinion, PCT/GB2011/000670, Sep. 21, 2011, 11 pages.

Gross, Richard A., et al., "Biodegradable polymers for the environment," www.sciencemag.org, Aug. 2, 2002, pp. 803-807, vol. 297, Science.

Hazer, Baki, et al., "Preparation of multiphase block copolymers by redox polymerization process," Die Angewandte Makromolekulare Chemie, 1992, pp. 121-127, vol. 195, No. 3364, Hüthig & Wepf Verlag, Basel.

Hollander, Agnes F., et al., "Adsorption characteristics of polyacrylamide and sulfonate-containing polyacrylamide copolymers on sodium kaolinite," Journal of Applied Polymer Science, 1981, pp. 2123-2138, vol. 26, John Wiley & Sons, Inc.

Karlsson,Sigbritt, et al., "Biodegradable polymers and environmental interaction," 1998, pp. 1251-1253, vol. 38, No. 8, Polymer Engineering and Science.

Kenley, Richard A., "Degradable polymers. Incorporating a difunctional azo compound into a polymer network to produce thermally degradable polyurethanes," Macromolecules, 1985, pp. 127-131, vol. 18, No. 2, American Chemical Society.

Keunings, R., et al., "Journal of non-newtonian fluid mechanics," vol. 96, 2001, cover and publishing pages plus 10 information pages, Elsevier Science B.V.

Kulicke, W.-M., et al., "Preparation, characterization, solution properties and rheological behaviour of polyacrylamide," Prog. Polym. Sci., 1982, pp. 373-468, vol. 8, Pergamon Press Ltd., Great Britain.

Kulicke, W.-M., et al., "Zur frage der instabilität von polyacrylamidlösungen," Die Angewandte Makromolekulare Chemie, 1977, pp. 189-210, plus cover and publishing pp., vol. 69, No. 1052, Hüthig & Wepf Verlag, Basel.

Lai, Junying, et al., "Linear azo polymer containing conjugated 5,5'-azodisalicylic acid segments in the main chain: synthesis, characterization, and degradation," Macromolecular Rapid Communications, 2005, pp. 1572-1577, vol. 26, Wiley-VCH Verlag GmbH & Co. KGaA, Weinheim.

Letsch, Jörg, et al., "New results of the free radical ring-opening polymerization," Journal of Polymer Science: Part A: Polymer Chemistry, 1994, pp. 2867-2871, vol. 32, John Wiley & Sons, Inc.

Misra, Gauri S., et al., "Aqueous redox polymerization of acrylamide initiated by citric acid/permanganate," Die Makromolekulare Chemie, 1976, pp. 21-37 plus cover and publishing pp., vol. 177, No. 1, Hüthig & Wepf Verlag, Basel.

Nair, Lakshmi S., et al., "Biodegradable polymers as biomaterials," Progress in Polymer Science, 2007, pp. 762-798, vol. 32, Elsevier Ltd.

Nakken, Torgeir, et al., "Effects of molar mass, concentration and thermodynamic conditions on polymer-induced flow drag reduction," European Polymer Journal, 2004, pp. 181-186, vol. 40, Elsevier Ltd.

Nakken, Torgeir, et al., "Measurements of polymer induced drag reduction and polymer scission in Taylor flow using standard double-gap sample holders with axial symmetry," Journal of Non-Newtonian Fluid Mechanics, 2001, pp. 1-12, vol. 97, Elsevier Science B.V.

Nuyken, Oskar, et al., "Graft and block copolymers via polymeric azo initiators," 1986, pp. 145-199 plus cover and publishing pages of "Chromatography/foams/copolymers" by Y. Doi, et al., Springer-Verlag Berlin Heidelberg.

Nuyken, Oskar, et al., "Synthesis and application of thermosensitive microcapsules containing azo groups," Die Angewandte Makromolekulare Chemie, 1991, pp. 207-224, vol. 187, No. 3176, Hüthig & Wepf Verlag, Basel.

Office Action dated Feb. 1, 2012 (18 pages), U.S. Appl. No. 12/771,973, filed Apr. 30, 2010.

(56) References Cited

OTHER PUBLICATIONS

Office Action (Final) dated Jun. 4, 2012 (9 pages), U.S. Appl. No. 12/771,973, filed Apr. 30, 2010.
Office Action dated Jul. 20, 2012 (27 pages), U.S. Appl. No. 12/771,961, filed Apr. 30, 2010.
Ozturk, Temel, et al., "Synthesis of block copolymers via redox polymerization process: a critical review," http://journal.ippi.ac.ir, 2007, pp. 561-581, vol. 16, No. 8, Iranian Polymer Journal.
Popa, Aura Angelica, et al., "Some polyamides, polyesters, and polyurethanes containing azo groups," Polym.- Plast. Technol. Eng., 1992, pp. 871-884, vol. 31, Nos. 9 and 10, Marcel Dekker, Inc.
Sanda, Fumio, et al., "Radical ring-opening polymerization," Journal of Polymer Science: Part A: Polymer Chemistry, 2001, pp. 265-276, vol. 39, John Wiley & Sons, Inc.
Sarac, A.S., "Redox polymerization," Progress in Polymer Science, 1999, pp. 1149-1204, vol. 24, Elsevier Science Ltd.
Shimura, Yukio, et al., "Thermodegradable polyurethanes having azo groups in the main chains. 1. Synthesis and thermal properties," Macromolecules, 1993, pp. 5004-5008, vol. 26, No. 19, American Chemical Society.
Soga, Osamu, et al., "Physicochemical characterization of degradable thermosensitive polymeric micelles," XP-002658700, Langmuir, 2004, pp. 9388-9395, vol. 20, No. 21, American Chemical Society.
Swift, Graham, "Biodegradable water-soluble polymers," Chapter 12 of "Plastics and the environment" by Anthony L. Andrady, 2003, pp. 491-519 plus cover and publishing pages, John Wiley & Sons, Inc., USA.
Tanchak, Oleh M, et al. "Light-induced reversible volume changes in thin films of azo polymers: the photomechanical effect," Macromolecules, 2005, pp. 10566-10570, vol. 38, No. 25, American Chemical Society.
Tsarevsky, Nicolay V., et al., "Combining atom transfer radical polymerization and disulfide/thiol redox chemistry: a route to well-defined (bio)degradable polymeric materials," XP-002646814, Macromolecules, 2005, pp. 3087-3092, vol. 38, No. 8, American Chemical Society.
Tunca, Umit, "Aqueous polymerization of acrylamide initiated by redox pair: CE(IV)—azo compounds with methylol functional groups," Eur. Polym. J., 1995, pp. 785-789, vol. 31, No. 8, Elsevier Science Ltd.
Tunca, Ümit, et al., Polymerization of acrylamide initiated by the redox system Ce(IV)-4,4'-azobis (4-cyano pentanol), Polymer Bulletin, 1989, pp. 483-488, vol. 22, Springer-Verlag.
Van Den Mooter, G., et al., "Use of azo polymers for colon-specific drug delivery," Journal of Pharmaceutical Sciences, Dec. 1997, pp. 1321-1327, vol. 86, No. 12, American Chemical Society and American Pharmaceutical Association.
Wei, Yen, et al., "Controlled free radical ring-opening polymerization and chain extension of the "living" polymer," Journal of Polymer Science: Part A: Polymer Chemistry, 1998, pp. 761-771, vol. 36, John Wiley & Sons, Inc.
Williams, Peter A., "Handbook of industrial water soluble polymers," Chapters 1 and 4, 2007, pp. 1-9 and 73-97 plus cover and publishing pages, Blackwell Publishing Ltd.
Yamaoka, Tetsuji, et al., "Linear type azo-containing polyurethane as drug-coating material for colon-specific delivery: its properties, degradation behavior, and utilization for drug formulation," Journal of Controlled Release, 2000, pp. 187-197, vol. 66, Elsevier Science B.V.
Office Action (Final) dated Jan. 3, 2013 (19 pages), U.S. Appl. No. 12/771,961, filed Apr. 30, 2010.
Wako Specialty Chemicals webpage for VA-080 water soluble azo initiator, Dec. 20, 2012, 2 pages, http://www.wako-chem.co.jp/specialty/waterazo/VA-080.htm, Wako Pure Chemical Industries, Ltd.
Foreign communication from a related counterpart application—International Search Report and Written Opinion, PCT/US2013/046111, Sep. 18, 2013, 11 pages.
Advisory Action dated Mar. 21, 2013 (7 pages), U.S. Appl. No. 12/771,961, filed Apr. 30, 2010.
Office Action (Final) dated Sep. 9, 2013 (10 pages), U.S. Appl. No. 12/771,973, filed Apr. 30, 2010.
Office Action dated May 8, 2013 (13 pages), U.S. Appl. No. 12/771,973, filed Apr. 30, 2010.

\* cited by examiner

Previous general polymer syntheses

Method 1

Specific tested diinitiators
Di-photoinitiator synthesis

Other possible diamines:

ATRP-based diinitiators

*FIG. 1*

An ideal weakly crosslinked system

METHODS TO PREVENT FORMATION DAMAGE FROM FRICTION REDUCERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Field

This disclosure relates to servicing a wellbore. More specifically, it relates to methods of preventing formation damage from friction reducers.

Background

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Friction reducers are typically included in wellbore servicing fluids during pumping in order to minimize damage to the formation. Generally, friction reducers comprise aqueous solutions of a chemical additive which function to alter the fluid rheology by enhancing the viscosity and lowering the friction. When the chemical additive comprises a polymer, e.g., polyacrylamide, the polymer could, over a period of time degrade. For example, degradation of the polymer may occur by hydrolysis of the polymer resulting in charged compounds that can be neutralized by the formation of a salt. These salts of polymeric origin tend to form polymer-cation aggregates in the presence of multivalent cations such as calcium, magnesium, or aluminum. These polymer-cation aggregates will grow in size over time and can clog surface equipment, piping, and potentially cause pore closure in downhole formations. Thus, an ongoing need exists for friction reducers having a reduced tendency to form such aggregates.

SUMMARY

Disclosed herein is a method of servicing a wellbore comprising placing a wellbore servicing fluid comprising a modified friction reducer into the wellbore.

Also disclosed herein is a modified friction reducer comprising a degradable polymer having functional degradable moieties, a polymer having a molecular weight of from about 5M to about 30M, a polymer having a PDI of from about 1.0 to about 2.5, a weakly crosslinked polymer, or combinations thereof.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like part's.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are methods of servicing a wellbore. In an embodiment, the method comprises placing a wellbore servicing fluid (WSF) comprising a modified friction reducer into a wellbore. In an embodiment, the modified friction reducer comprises a friction reducer that has been subjected to one or more techniques such as functional moiety degradation (FMD), overall concentration reduction (OCR), and/or crosslinking reduction (CR). FMD, OCR, and CR will be described in more detail later herein. Methods of servicing a wellbore with fluids comprising modified friction reducers may either reduce or eliminate the formation damage potential associated with the use of these fluids during wellbore servicing operations.

In an embodiment, a method of servicing a wellbore comprises placing a WSF comprising a modified friction reducer into the wellbore. In an embodiment, the modified friction reducer comprises a degradable polymer. Examples of degradable polymers suitable for use as modified friction reducers include without limitation polysaccharides, polyacrylamide, or combinations thereof. In an embodiment, the degradable polymer comprises polyacrylamide. Herein, the disclosure may refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials.

In an embodiment, a modified friction reducer comprises a polymer (e.g., polyacrylamide) having functional degradable moieties in the polymer backbone. In such embodiments, the modified friction reducer when introduced to the wellbore as a component of a WSF may function as intended during the wellbore servicing operation. Subsequent to the wellbore servicing operation, the functional degradable moieties of the modified friction reducer may be subject to one or more wellbore conditions that result in degradation of the modified friction reducer by reaction of these moieties. Degradation of the modified friction reducer as a result of reaction of the functional moieties is herein termed functional moiety degradation. The degradation products of the modified friction reducer may exhibit a reduced tendency to form aggregates in the presence of multivalent cations such as calcium, magnesium or aluminum and thereby reduce the potential of these materials to adversely affect the formation and/or wellbore servicing operations.

Examples of functional degradable moieties suitable for use in this disclosure include but are not limited to esters, amides, ethylene oxides, carbonates, acetals, and the like. In an embodiment, the functional degradable moieties of the modified friction reducer are introduced to the polymer backbone at positions designed to produce degradation products within one or more user and/or process desired size ranges. For example, the functional degradable moieties may have been introduced to the polymer backbone so as to provide degradation products having a desired number average molecular weight ($M_n$) range from about 0.5M to about 5M, alternatively from about 1M to about 4M, alternatively from about 2M to about 3M or alternatively from about 1 M to about 2M. Molecular weight (MW) is expressed in millions of Da, e.g., a polymer with a molecular weight of $7 \times 10^6$ Da will be described as a polymer with a MW of 7M, where M stands for $10^6$ Da.

In an embodiment, the modified friction reducer comprises polyacrylamide having functional degradable moieties. Without wishing to be limited by theory, degradation of the modified friction reducer results in lower molecular weight degradation products which keep the polymer concentration within a WSF below the overlap concentration C*. Herein, the overlap concentration, C* refers to the polymer solution concentration below which the steric and frictional interactions of neighboring polymer coils are negligible. Alternatively, C* can refer to the crossover concentration between the dilute and semidilute states of a polymeric solution. C* is directly proportional to the MW of a polymer, and consequently is directly proportional to the size of the polymer chains. In other words, the size of the polymer chain in terms of MW could be used for predicting whether the polymer chain will form aggregates. C* is described in more detail in Macromolecules (1987), volume 20, pages 362-366, which is incorporated by reference herein.

In an embodiment, the modified friction reducer comprises a limited number of functional degradable moieties in the polymer backbone. For example, the modified friction reducer may have about 3 functional degradable moieties per polymer chain, alternatively from about 1 to about 5 functional degradable moieties per polymer chain, or alternatively from about 2 to about 4 functional degradable moieties per polymer chain.

In an embodiment, the functional degradable moiety may be introduced to the polymer backbone using any suitable methodology. In an embodiment, the modified friction reducer is prepared by introducing the functional degradable moiety in the polymer backbone (e.g., polyacrylamide) during polymerization with a diradical diinitiator. By definition, a diradical diinitiator is an initiator molecule capable of forming polymers on each of its two ends, as opposed to a radical initiator which is capable of forming polymers on one end only. Examples of diradical diinitiators suitable for use in the FMD method include but are not limited to diamine-based photo-diinitiators and atom transfer radical polymerization (ATRP)-based initiators. In an embodiment the diinitiator excludes cerium nitrate.

In an embodiment, the diradical diinitiator is a diamine-based photo-diinitiator. A diamine-based photo-diinitiator suitable for use in the present disclosure can be characterized by general Formula I.

Formula I where $R_1$ is meta-phenylene, ethylene, or —$(CH_2$—$CH_2$—$NH)_n$—$CH_2$—$CH_2$—. Referring to formula I, the atoms in parentheses represent repeating units of the formula where the repeating units may occur n times with the value of n ranging from about 1 to about 1000, alternatively from about 1 to about 500, alternatively from about 2 to about 50, or alternatively from about 2 to about 10, alternatively from about 2 to about 5, or alternatively from about 2 to about 4.

In an embodiment, the diinitiator comprises one or more compounds characterized by general Formula II:

Formula II wherein $R_2$ comprises any leaving group suitable for use with the methods of this disclosure, and $R_3$ comprises any deactivating group suitable for use with the methods of this disclosure. A leaving group herein refers to a molecular fragment that would depart from a chemical compound with a pair of electrons in a heterocyclic bond cleavage while a deactivating group, also known as an electron-withdrawing group, refers to an atom or a group of atoms that draws the electron density toward itself in a given compound. In an embodiment, $R_2$ comprises halides (e.g., bromide, chloride), tosylates (e.g., p-toluenesulfonate), mesylates (e.g., methanesulfonate), methyl sulfate, nitrates (e.g., —$ONO_2$), phosphates (e.g., —$OPO(OH)_2$), acyl chlorides, tetraalkylammonium salts, ammonium salts, esters, acid anhydrides, alcohols, carboxylic acids, phenoxides, ethers, and the like. In an embodiment, $R_3$ comprises a phenyl group ($C_6H_5$—), nitro group, tetraalkylammonium salts, ammonium salts, cyano groups, sulfonates, carboxylic acids, esters, aldehydes, ketones, and the like, all of which may be attached to an alkyl chain (e.g., $O_2N$—$CH_2$—) or any other suitable moiety.

Examples of diamine-based photo-diinitiators suitable for use in the present disclosure include without limitation compounds having Structure I and/or Structure II.

Structure I

Structure II

Referring to Structure II, the atoms in parentheses represent repeating units of the formula where the repeating units may occur n times with the value of n ranging from about 1 to about 1000, alternatively from about 1 to about 500, alternatively from about 2 to about 50, or alternatively from about 2 to about 10, alternatively from about 2 to about 5, alternatively from about 2 to about 4.

In an aspect, a modified friction reducer of the type disclosed herein is prepared using an ATRP-based diinitiator. In an embodiment, the ATRP based diinitiator comprises 2-hydroxyethyl 2'-bromoisobutyrate (HO-EBiB), propargyl 2-bromoisobutyrate (Prop-BiB), bis(2-[2'-bromoisobutylyloxyl]ethyl)disulfide (BiBOEDS), di', tri', tetra,' or hexafunctional initiators with bromoisobutyrate groups or combinations thereof. In an embodiment, the ATRP, based diinitator comprises a compound characterized by any of Structures IIIa-IIIg.

Structure IIIa

Structure IIIb

Structure IIIc

Structure IIId

Structure IIIe

Structure IIIf

Structure IIIg

Figure 1:
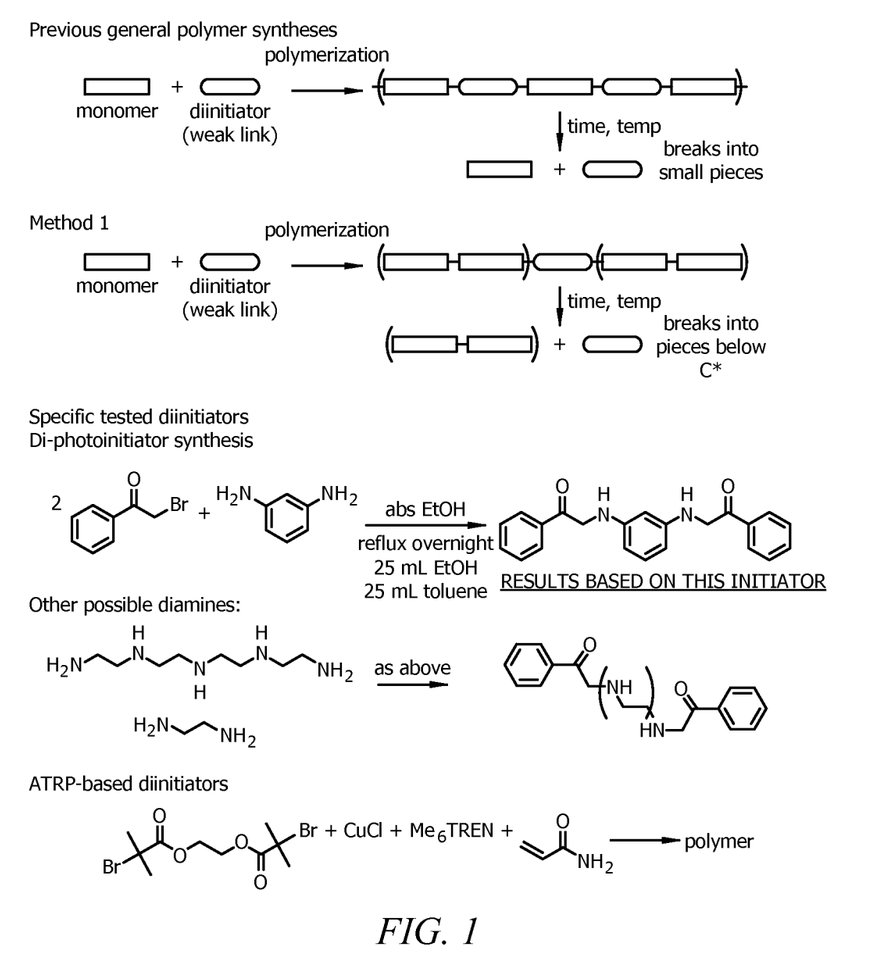
FIG. 1 is a schematic of various polymerization methods.

Methods and conditions for forming polymers (e.g., polyacrylamide) utilizing diamine-based photo-diinitiators or ATRP-based diinitiators of the type disclosed herein are known to one of ordinary skill in the art with the aid and benefits of this disclosure and schematized generally in FIG. 1. Polymerization techniques utilizing diinitatiors are described in more detail in J. Poly. Science (2010), Volume 48, pages 1878-1886, which is incorporated by reference herein in its entirety.

In an embodiment, a modified friction reducer comprises a polymer solution having a concentration that is reduced when compared to the amount typically utilized for friction reduction. For example, if polymer A is utilized as a friction reducer at concentration x, then the modified friction reducer of this disclosure can be used at concentrations of 0.5x, 0.1x, 0.01x, or 0.001x and achieve comparable friction reduction efficiencies. Without wishing to be limited by theory, a modified friction reducer comprising a polymeric material having a higher molecular weight and/or a narrow PDI would generally allow for the use of less polymeric material that provides some user and/or process desired amount of friction reduction. Utilization of a reduced amount of modified friction reducer may result in there being a reduced amount of degradation products such that the formation of aggregates is avoided.

In an embodiment of the OCR method, the modified friction reducer comprises a higher molecular weight polymer and/or a polymeric material having a narrow polydispersity index (PDI). The polymer may comprise acrylic acid-based polymers, acrylamide-based polymers, methacrylic acid-based polymers, methacrylamide-based polymers, or combinations thereof.

In an embodiment, the modified friction reducer comprises higher MW polymers (e.g., higher MW polyacrylamide). In an embodiment, the higher MW polymer (e.g., polyacrylamide) ranges in size from about 5M to about 30M, alternatively from about 10M to about 28M, or alternatively from about 17M to about 26M. In an embodiment, the modified friction reducer comprises the higher molecular weight polymer and exhibits some user and/or process desired friction reducing ability when used in amounts ranging from about 0.001 weight percent (wt. %) to about 2 wt. %, alternatively from about 0.05 wt. % to about 1 wt. %, or alternatively from about 0.1 wt. % to about 0.5 wt. % based on the weight of the WSF to which the friction reducer may be added.

In an embodiment, the modified friction reducer comprises a polymeric material having a narrow PDI. PDI is a measure of the heterogeneity of the polymer solution. The lower the PDI, the more homogeneous the solution is, i.e., the polymer chains are more similar in size. The higher the PDI value, the more heterogeneous the polymer solution is, i.e., the polymer chain lengths are very different, leading to a very wide distribution of MWs in the polymer solution. Without wishing to be limited by theory, a narrow PDI allows for effective use of a lower MW polymer, as most of the polymer chains are of similar size and would contribute to a similar extent to the friction reducing ability of the material. For example, a polymeric material having a broad PDI (i.e., PDI values greater than about 1.6) may have the friction reducing capabilities associated with the higher molecular weight portion of the polymeric composition. If the higher molecular weight portion comprises only a small fraction of the total composition (e.g. 20%) only that fraction of the total composition functions as a friction reducer. Thus, more of the broad PDI polymeric material is required to achieve the desired friction reducing efficiency when compared to a narrow PDI polymeric material which may have the portion of polymer responsible for the friction reducing efficiency present in a larger amount (e.g., 80%). In an embodiment, the modified friction reducer comprises a polymeric material having molecular weight in the range of from about 4M to about 10M, alternatively from about 5M to about 9M, or alternatively from about 6M to about 7M and a PDI in the range of from about 1 to about 2.5, alternatively from about 1.1 to about 1.8, or alternatively from about 1.2 to about 1.5.

Figure 2:
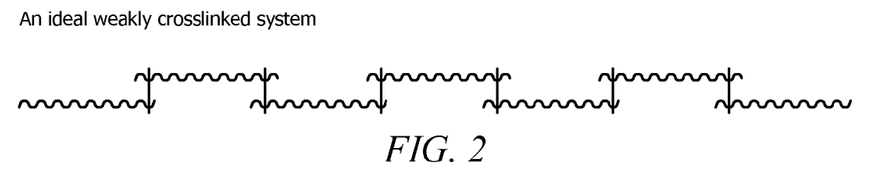
FIG. 2 is a schematic of a weakly crosslinked polymer.

In an embodiment, the modified friction reducer comprises a weakly crosslinked polymeric material. A weakly crosslinked polymeric material suitable for use as a modified friction reducer may comprise strongly entwined, but ultimately reversible networks. Weakly crosslinked polymeric materials suitable for use as modified friction reducers include without limitation polymers comprising non-covalent ionic crosslinks, degradable crosslinks, and crosslinked polysaccharides. Specific examples of modified friction reducers comprising weakly crosslinked polymeric materials are depicted in FIG. 2. Referring to FIG. 2, the wavy horizontal lines represent the polymer chains, and the thick vertical lines represent the crosslinks.

In an embodiment, the modified friction reducer comprises a polymeric material having non-covalent ionic crosslinks. Such materials may be prepared by contacting oppositely charged polymeric materials under conditions suitable for the formation of ionic-bonds. In an embodiment, a weakly crosslinked polymeric material is prepared by contacting an anionic polymer and a cationic polymer. For example, a partially hydrolyzed polyacrylamide which is anionic will form a strong but reversible polymer network with cationic polymers such as poly-diallyldimethylammonium.

In an embodiment, the modified friction reducer comprises a polymeric material having covalent degradable crosslinks. In an embodiment, a modified friction reducer comprising a polymeric material having covalent degradable crosslinks is characterized by polymer chain lengths ranging from about 0.75M to about 5M, alternatively from about 1M to about 4M, or alternatively from about 2M to about 3M. In some embodiments, a polymeric material having covalent degradable crosslinks for use as a modified friction reducer is formed by crosslinking under sheer. Crosslinking under sheer specifically refers to crosslinking under flow with the result of crosslinking inter-chain as opposed to intra-chain. Crosslinking under sheer is described in more detail in Macromolecules (1985), volume 18, pages 1915-1918, which is incorporated by reference herein in its entirety.

In comparison to the FMD method, the modified friction reducer comprising covalent degradable crosslinks utilizes short polymer lengths coupled with the presence of degradable covalent crosslinks to generate a weakly crosslinked polymeric material. The modified friction reducer comprising covalent degradable crosslinks has the degradable portions (i.e., crosslinks) disposed between polymer chains such that degradation of the polymer results in intact polymer chains. In contrast, a modified friction reducer prepared by the FMD method has functional degradable moieties disposed along the backbone of a polymer chain. Degradation of the modified friction reducer prepared by the FMD method is expected to result in polymer fragments of differing lengths depending on the location of the functional degradable moiety. Degradation of the modified friction reducer comprising a polymeric material having covalent degradable crosslink is expected to result in intact polymer chains having the previously disclosed polymer chain lengths.

Examples of weak crosslinkers that may be employed in the formation of a modified friction reducer comprising a polymeric material having covalent degradable crosslinks are the compounds characterized by Structures IV, Structure V and Structure VI.

Structure IV

Structure V

Structure VI

Referring to Structures IV-VI, the atoms in parentheses represent repeating units of the formula where the repeating units may occur n times with the value of n ranging from about 1 to about 1000, alternatively from about 1 to about 500, alternatively from about 2 to about 50, alternatively from about 2 to about 10, alternatively from about 2 to about 5, or alternatively from about 2 to about 4.

In an embodiment, the modified friction reducer comprises a weakly crosslinked polysaccharide. Polysaccharides suitable for use in the formation of the modified friction reducer include without limitation derivatized polysaccharides such as guar, xanthan, diutan, and combinations thereof.

In embodiments where the modified friction reducer comprises a degradable moiety (e.g., a functional degradable moiety, covalent degradable crosslink) degradation of that moiety may be carried using any suitable methodology. In some embodiments, the friction reducer is a component of a WSF that is placed into a wellbore. In such embodiments, conditions within the wellbore (e.g., pH, temperature, moisture) may be sufficient to promote degradation of the modified friction reducer. In some embodiments, the modified friction reducer is contacted with one or more materials placed into the wellbore which function to degrade the degradable portions of the modified friction reducer. For example, the modified friction reducer may be contacted with an acidic material, or a pH-modifying material. Any suitable methodology may be employed for contacting the modified friction reducer comprising degradable portions with materials which degrade the degradable portions. In an embodiment, a method of servicing a wellbore in a subterranean formation comprises placing a WSF comprising a modified friction reducer having degradable portions into the wellbore. The method may further comprise introducing one or more materials which function to degrade the degradable portions of the modified friction reducer. In such embodiments, introduction of the one or more materials which function to degrade the degradable portion of the modified friction reducer are introduced sometime after the modified friction reducer has served its intended function in the wellbore.

In an embodiment, the modified friction reducer comprises a polyacrylamide modified with ester linkages as the functional degradable moieties. In such an embodiment, degradation of the modified friction reducer could be achieved by hydrolysis of the ester linkages under the conditions typically encountered in a wellbore.

In an embodiment, the modified friction reducer comprises a polyacrylamide modified with amide linkages as the functional degradable moieties incorporated into the backbone. In such an embodiment, degradation of the modified friction reducer could be achieved by hydrolysis of the friction reducer under basic conditions and increased temperatures.

In an embodiment, the modified friction reducer comprises a polyacrylamide having a molecular weight of equal to or greater than about 15M and/or a PDI ranging from about 1.0 to about 2.5. In such embodiments, the modified friction reducer may be included in a wellbore servicing fluid in amounts ranging from about 0.01 wt. % to about 0.5 wt. % based on the weight of the WSF to which the friction reducer may be added.

In an embodiment, a modified friction reducer of the type disclosed herein exhibits a friction reducing efficiency of from about 20% to about 80%, alternatively from about 30% to about 70%, or alternatively from about 40% to about 60%.

The modified friction reducers disclosed herein may be included in any suitable wellbore servicing fluid. As used herein, a "servicing fluid" refers to a fluid used to drill, complete, work over, fracture, repair, or in any way prepare a wellbore for the recovery of materials residing in a subterranean formation penetrated by the wellbore. Examples of servicing fluids include, but are not limited to, cement slurries, drilling fluids or muds, spacer fluids, fracturing fluids or completion fluids. It is to be understood that "subterranean formation" encompasses both areas below exposed earth and areas below earth covered by water such as ocean or fresh water.

In an embodiment, the modified friction reducers may be included in wellbore servicing fluids that are employed in well completion operations such as primary and secondary cementing operations. The wellbore servicing fluids may be placed into an annulus of the wellbore and allowed to set such that it isolates the subterranean formation from a different portion of the wellbore. The wellbore servicing fluids thus form a barrier that prevents fluids in the subterranean formation from migrating into other subterranean formations. Within the annulus, the wellbore servicing fluids also serves to support a conduit, e.g., casing, in the wellbore. In an embodiment, the wellbore in which the wellbore servicing fluids are positioned belongs to a multilateral wellbore configuration. It is to be understood that a multilateral wellbore configuration refers to a primary wellbore with one or more secondary wellbore branches radiating from the primary borehole.

The modified friction reducers may be introduced into a wellbore where they will function as intended, subsequently degrade and exhibit a reduced tendency to form aggregates that could potentially damage the formation.

In an embodiment, modified friction reducers of the type disclosed herein may be advantageously employed under challenging wellbore conditions and can be used at temperatures ranging from about 80° F. to about 400° F., alternatively from about 100° F. to about 350° F. or alternatively from about 150° F. to about 300° F.

In an embodiment, a traditional friction reducer comprises a degradable polymer. When using traditional friction reducers, the degradable polymer may form one or more degradation products that interact with constituents disposed within the wellbore to produce materials that adversely affect the wellbore servicing operation. For example, the friction reducer may comprise polyacrylamide which can hydrolyze over time into polyacrylamide-co-acryllic salts. The polyacrylamide-co-acrylic salts may complex multivalent cations disposed in the wellbore (e.g., $Ca^{2+}$, $Mg^{2+}$, $Al^{3+}$) and form aggregates. When the polymer-cation aggregates reach the critical overlap concentration C*, they will form gel-like structures and could lead to wellbore damage comprising clogging of the equipment piping, and pore closure in downhole formation. In an embodiment, the methods described in this disclosure, i.e., the functional moiety degradation method, overall concentration reduction method, and crosslinking reduction method, yield modified friction reducers whose degradation products are designed to remain under C* for the duration of servicing the wellbore and exhibit a reduced tendency to form aggregated polymer-cation complexes. In an embodiment, the methods disclosed herein provide for modified friction reducers which display some user and/or process desired friction reducing efficiency at a sufficiently low concentration so as to have a concentration of degradation products that are designed to remain under C* for the duration of servicing the wellbore and exhibit a reduced tendency to form polymer-cation aggregates.

In an embodiment, the modified friction reducers described in the present disclosure function as low-damaging friction reducers in highly caustic environments within wellbores comprising sensitive formations. Examples of sensitive formations include without limitation formations heavy with monovalent cations such as sodium and potassium and polyvalent cations such as $Mg^{2+}$ and $Ca^{2+}$ in carbonates and swellable clay contained in the formation.

Modified friction reducers of the type disclosed herein reduce energy losses due to friction in the wellbore servicing fluids. For example, the modified friction reducers may reduce energy losses during introduction of the aqueous treatment fluid into a well bore due to friction between the aqueous fluid in turbulent flow and the formation and/or tubular good(s) (e.g., a pipe, coiled tubing, etc.) disposed in the wellbore. Modified friction reducers of the type disclosed herein may be included in a wellbore servicing fluid in any amount sufficient to provide the desired level of friction reduction. In some embodiments, the modified friction reducer may be present in an amount in the range of from about 1 ppm to about 5,000 ppm, alternatively from about 10 ppm to about 3,000 ppm or alternatively from about 100 ppm to about 1,000 ppm.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Figure 3:
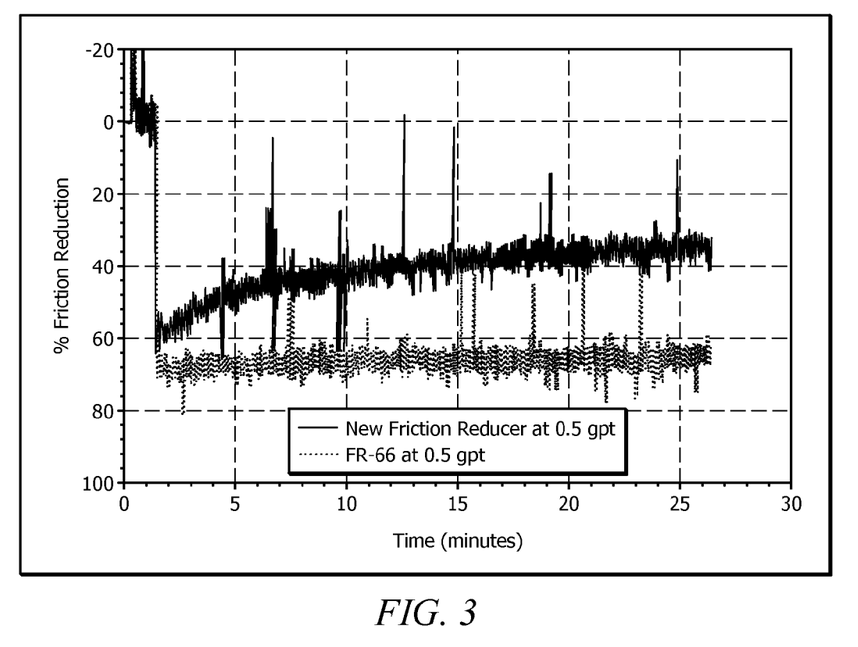
FIG. 3 is a plot of the percentage friction reduction as a function of time for the samples from example 1.

The properties of a wellbore servicing fluid comprising a modified friction reducer were investigated. Specifically, the friction reduction efficiency variation over time was compared for FR-66 and a modified friction reducer of the type disclosed herein. The results of this comparison are presented in FIG. 3. FR-66 friction reducer is a liquid friction reducer that is commercially available from Halliburton Energy Services. Both FR-66 friction reducer and the modified friction reducer were used at a concentration of 0.5 gallons per 1,000 gallons (gpt), and the testing solution was prepared by adding the friction reducer to fresh water. The modified friction reducer tested was a polyacrylamide polymer obtained by reacting the diamine-based photo-diinitiator of Structure I with a polyacrylamide chain with a MW of 1M. The samples were tested in friction loop experiments, by measuring the pressure gradient difference across a section of a metal pipe, where the polymeric aqueous solutions were flowed through. Water was used as a baseline as it has 0% friction reduction efficiency. When a polymer is added to the water, there is a pressure drop across a section of the metal pipe. The fluids were sent inside the pipe at a turbulent flow of 10 gallons/min, 16 gallons/min, or 26 gallons/minute. The friction loop technique is described in more detail in U.S. Patent Publication No. 20090298721 A1, which is incorporated by reference herein in its entirety.

Example 2

Figure 4:
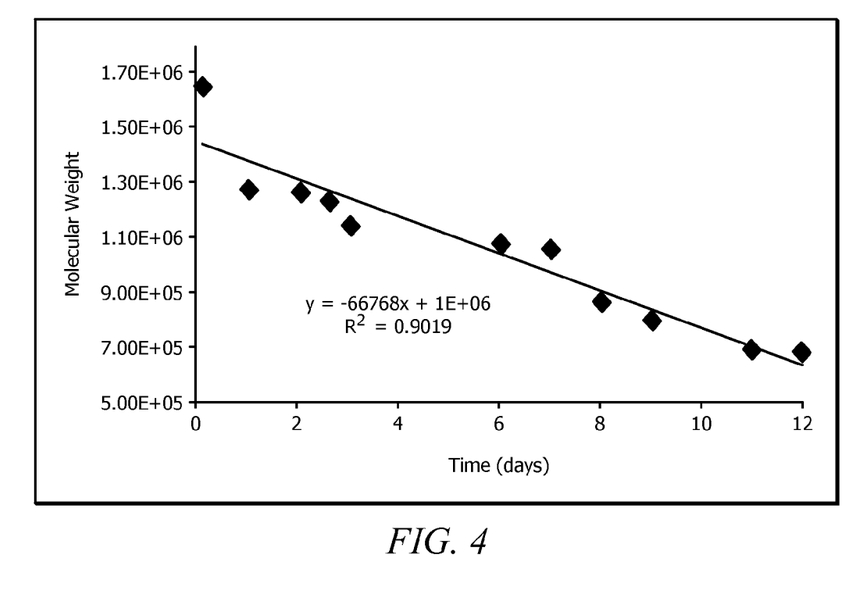
FIGS. 4 and 5 are plots of the molecular weight as function of time for the samples from example 2.

The properties of a wellbore servicing fluid comprising a modified friction reducer were investigated. The modified friction reducer tested was a polyacrylamide-based higher molecular weight polymer with a MW of 16M, and is hereinafter designated MFR-X. Specifically, the stability of the MFR-X molecular weight over time was determined. MFR-X molecular weight degradation over time was monitored by multi-angle laser light scattering (MALLS). The samples were prepared at a concentration of 2 mg/mL modified friction reducer in water which was adjusted to a pH of 4.75 with BA-20 buffering agent. BA-20 buffering agent is commercially available from Halliburton Energy Services. The molecular weight of MFR-X was monitored over a period of 12 days, and the data displayed in FIG. 4 indicate that there is a decay of the polymer molecular weight over this period of time, from 16M to 0.7M.

MFR-X was also tested in a friction reduction efficiency experiment, in a similar manner to the experiment described in Example 1. The friction reduction efficiency for MFR-X at a concentration of 0.05 gpt was compared to the friction reduction efficiency of FR-66 at a concentration of 0.5 gpt. Although the concentration of MFR-X was $\frac{1}{10}^{th}$ of the FR-66 concentration, they both displayed nearly the same friction reduction efficiency. The use of MFR-X at $\frac{1}{10}^{th}$ of the concentration of FM-66 would theoretically generate at most $\frac{1}{10}^{th}$ the amount of aggregates that could potentially damage the wellbore formation. However, since the concentration of modified friction reducer required to see an effective friction reduction efficiency is so low, it is expected that the system will be under the concentration overlap C* for cation complexation, and no aggregates should form.

Figure 5:
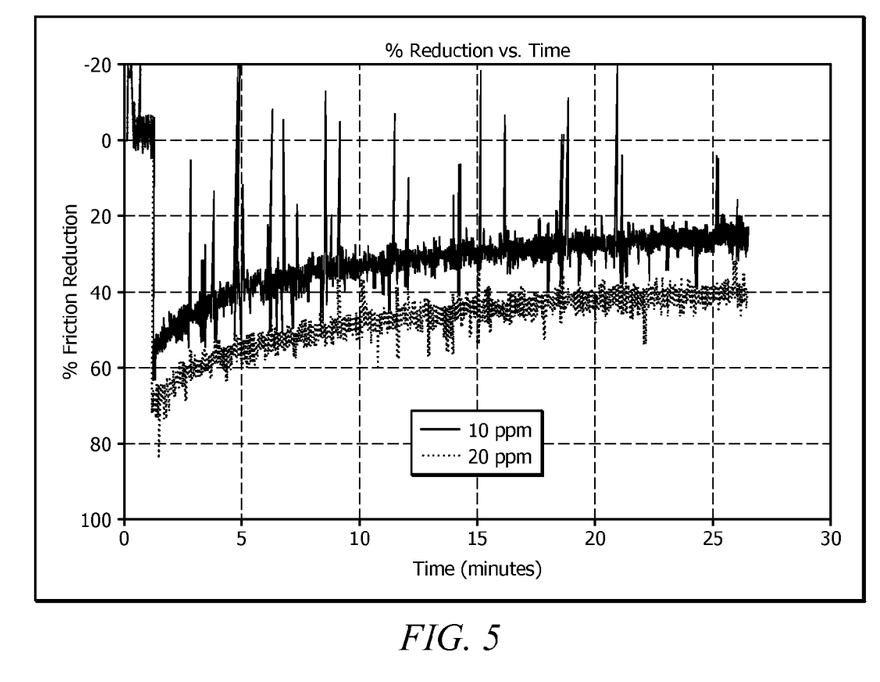

The friction reduction efficiency for MFR-X was investigated at two concentrations, 10 ppm and 20 ppm, and the results are displayed in FIG. 5. The friction reduction efficiency data of MFR-X used at either 10 ppm or 20 ppm is similar to the friction reduction efficiency for the FR-66 at 0.5 gpt. The results indicate that the overall concentration of the modified friction reducer can be lowered by a factor of 50-100, while still preserving the desired friction reduction efficiency.

Example 3

Figure 6:
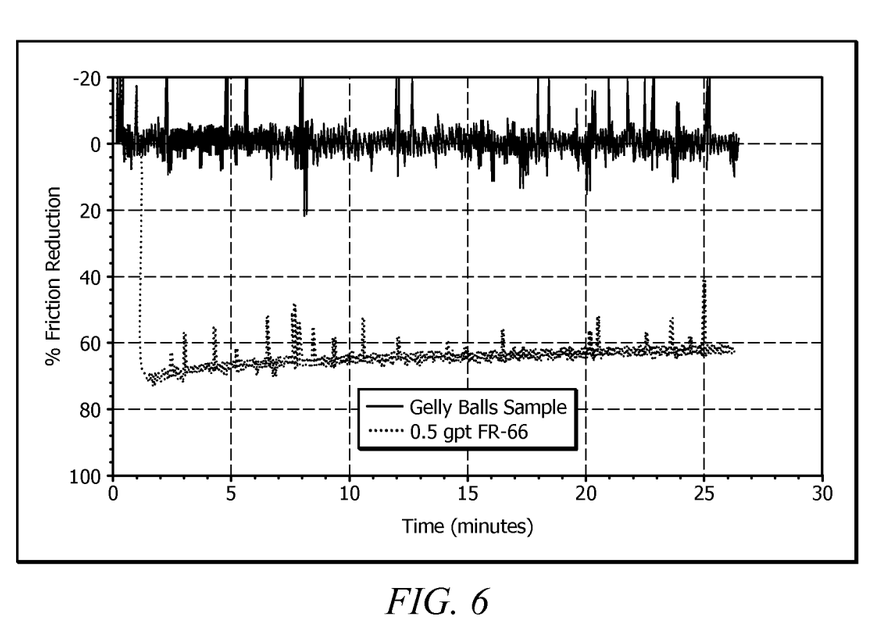
FIG. 6 is a plot of the percentage of friction reduction as a function of time for the samples from example 3.

The properties of a wellbore servicing fluid comprising a modified friction reducer comprising a weakly crosslinked polymer were investigated. The weakly crosslinked polymer was obtained by crosslinking polyacrylamide chains with a molecular weight of 1M in the presence of the weakly crosslinker of Structure IV. The modified friction reducer had highly labile crosslinks as a minor component with polyacrylamide as a major component. The weakly crosslinked polymer system was hydrated for 5 min, and then this material was directly tested in friction loop experiments of the type previously described herein. The friction reduction efficiency variation over time was recorded for the friction reducer FR-66 and the modified friction reducer, and the results of this comparison are displayed in FIG. 6. FR-66 was used at a concentration of 0.5 gpt, the modified friction reducer was also used at a concentration of 0.5 gpt, and the solutions were prepared by adding the respective friction reducer to fresh water. Friction reduction was negligible for the sample containing the modified friction reducer likely due to the extremely labile crosslinks.

ADDITIONAL DISCLOSURE

The following are nonlimiting, specific embodiments in accordance with the present disclosure:

Embodiment 1. A method of servicing a wellbore comprising placing a wellbore servicing fluid comprising a modified friction reducer into the wellbore.

Embodiment 2. The method of embodiment 1 wherein the modified friction reducer comprises polysaccharides, or polyacrylamide.

Embodiment 3. The method of embodiment 1 or 2 wherein the modified friction reducer comprises functional degradable moieties.

Embodiment 4. The method of embodiment 2 wherein the functional degradable moieties comprise esters, amides, ethylene oxides, carbonates, acetals, or combinations thereof.

Embodiment 5. The method of embodiment 3 or 4 wherein the functional degradable moieties are present in an amount of about 3 per polymer chain.

Embodiment 6. The method of any of embodiments 1-5 wherein the modified friction reducer is present in the wellbore servicing fluid in an amount of from about 1 ppm to about 5000 ppm.

Embodiment 7. The method of any of embodiments 1-6 wherein the modified friction reducer comprises a higher molecular weight polymer.

Embodiment 8. The method of embodiment 7 wherein the higher molecular weight polymer has a molecular weight of from about 5 M to about 30 M.

Embodiment 9. The method of embodiment 7 or 8 wherein the higher molecular weight polymer is present in the wellbore servicing fluid in an amount of from about 0.01 wt. % to about 0.5 wt. %.

Embodiment 10. The method of any of embodiments 1-9 wherein the modified friction reducer comprises a polymer having a PDI of from about 1.0 to about 2.5.

Embodiment 11. The method of any of embodiments 1-10 wherein the modified friction reducer comprises a weakly crosslinked polymer.

Embodiment 12. The method of embodiment 11 wherein the weakly crosslinked polymer comprises non-covalent ionic crosslinks.

Embodiment 13. The method of embodiment 11 or 12 wherein the modified friction reducer comprises a cationic and anionic polymer.

Embodiment 14. The method of embodiment 13 wherein the cationic polymer comprises a partially hydrolyzed polyacrylamide.

Embodiment 15. The method of embodiment 13 wherein the anionic polymer comprises poly-diallyldimethylammonium.

Embodiment 16. The method of embodiment 11 wherein the weakly crosslinked polymer comprises covalent degradable crosslinks.

Embodiment 17. The method of embodiment 11 or 16 wherein the weakly crosslinked polymer comprises polysaccharides.

Embodiment 18. The method of embodiment 11, 16, or 17 wherein the polysaccharides comprise guar, xanthan, diutan, or combinations thereof.

Embodiment 19. The method of any of embodiments 1-10 further comprising degrading the functional degradable moieties.

Embodiment 20. The method of embodiment 19 wherein degrading the functional degradable moieties comprises exposure to wellbore servicing conditions, contact with a degrading material, or combinations thereof.

Embodiment 21. A modified friction reducer comprising a degradable polymer having functional degradable moieties, a polymer having a molecular weight of from about 5M to about 30M, a polymer having a PDI of from about 1.0 to about 2.5, a weakly crosslinked polymer, or combinations thereof.

Embodiment 22. The modified friction reducer of embodiment 21 wherein the polymer comprises polyacrylamide.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore comprising:
preparing a friction reducer using a diradical diinitiator having Structure I or Structure II:

Structure I

Structure II and placing a wellbore servicing fluid comprising the friction reducer into the wellbore.

2. The method of claim 1 wherein the friction reducer comprises at least one additive selected from the group consisting of: a polysaccharide, a polyacrylamide, and any combination thereof.

3. The method of claim 1 wherein the friction reducer comprises functional degradable moieties.

4. The method of claim 3 wherein the functional degradable moieties comprise esters, amides, ethylene oxides, carbonates, acetals, or combinations thereof.

5. The method of claim 3 wherein the functional degradable moieties are present in an amount of about 3 per polymer chain.

6. The method of claim 3 wherein the friction reducer is present in the wellbore servicing fluid in an amount of from about 1 ppm to about 5000 ppm.

7. The method of claim 3 further comprising degrading the functional degradable moieties.

8. The method of claim 7 wherein degrading the functional degradable moieties comprises exposure to wellbore servicing conditions, contact with a degrading material, or combinations thereof.

* * * * *